UNITED STATES PATENT OFFICE.

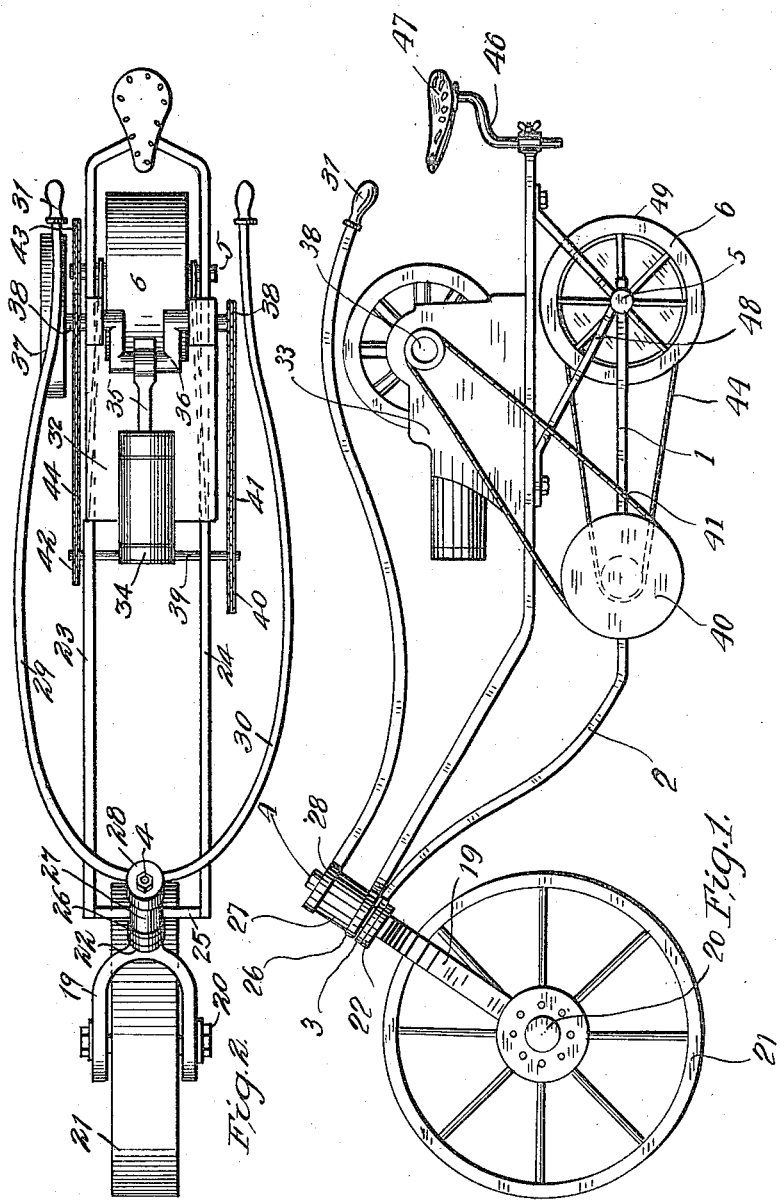

EUGENE ADLER, OF PITTSBURGH, PENNSYLVANIA.

MOTOR-DRIVEN TRACTOR.

1,165,930.  Specification of Letters Patent.  Patented Dec. 28, 1915.

Application filed July 15, 1914. Serial No. 851,233.

*To all whom it may concern:*

Be it known that I, EUGENE ADLER, a subject of the King of Hungary, residing at Pittsburgh, in the county of Allegheny and State of Pennsylvania, have invented new and useful Improvements in Motor-Driven Tractors, of which the following is a specification.

My invention relates to motor-driven tractors for agricultural implements, such, for example, as cultivators or weeders.

It is the principal object of my invention to provide a motor tractor for a cultivator or weeder, having two wheels, one directly in front of the other, and each narrow enough to go between consecutive rows of plants, such as corn or potatoes.

Another object is to provide such a tractor with a heavy rear driving wheel and a light front guide-wheel, together with means for easily steering the latter.

A further object is to provide a strong double frame for supporting the motor, and the driving connections between the motor and the drive-wheel.

Referring to the accompanying drawing, Figure 1 is a side view, and Fig. 2, a plan view, of a motor tractor embodying the principles of my invention.

On the drawing, 1 represents the lower frame of the tractor having the upturned forward portion 2 which is provided with the collar 3 on the steering post 4. The frame 1 at its rear end is mounted upon the axle 5 of the drive wheel 6. The steering-post 4 has the fork 19 between the members of which the light front wheel 21 is mounted. This wheel carries the axle 20 supported in the lower ends of the fork 19.

22 is a collar on the steering-post 4 and forms a bearing for the collar 3.

The upper frame of the tractor comprises the longitudinal bars 23 and 24, having their forward portions inclined upwardly and the remainder thereof substantially horizontal. The forward ends of the bars 23 and 24 are connected together by the transverse member 25 having integral therewith the collar 26 which is mounted on the steering-post 4.

27 is a bearing sleeve for the steering-post, and is connected to the collar 26.

28 is a collar resting on the sleeve 27 and fixed to the steering-post. It is provided with the curved handle-bars 29 and 30, each having a handle 31. Mounted on the horizontal part of the bars 23 and 24 is the motor support 32, on which the motor 34 of the explosive type is secured.

35 indicates the piston-rod connected to the crank-shaft 36, which has at one end the fly-wheel 37. The shaft 36 also carries the wheel 38, which is connected by the belt or chain 41 to the wheel 40 secured to the operating shaft 39 mounted on the lower frame 1. The shaft 39 is provided with the wheel 42 which is connected by the belt or chain 44 to the wheel or gear 43 carried by the axle 5. The bars 23 and 24 are connected together at their rear ends to which the post 46 carrying the seat 47 is connected. The rear end of the upper frame is supported by the inclined bars 48 and 49, which converge from the upper frame to the lower frame 1, on which they rest.

I claim—

1. In a motor weeder, an upper frame and a lower frame, having their forward ends converging upwardly, a steering-post journaled in the forward ends of the frames, and provided with a fork at its lower end, a front wheel journaled in the fork, a heavy drive wheel journaled on the rear end of the lower frame and positioned directly behind the front wheel, an operating shaft for the drive wheel connected to the lower frame, a motor for driving the operating shaft, supported by one of the frames, and means for controlling the steering-post.

2. In a motor weeder, an upper frame and a lower frame, having their forward ends converging upwardly, a steering-post journaled in the forward ends of the frames, and provided with a fork at its lower end, a front wheel journaled in the fork, a heavy drive wheel journaled on the rear end of the lower frame and positioned directly behind the front wheel, an operating shaft for the drive-wheel connected to the lower frame, a motor for driving the operating shaft, supported by one of the frames, and means for controlling the steering-post, the said wheels being narrow enough to travel between consecutive rows of plants.

3. In a motor-driven weeder, a narrow front wheel, a narrow rear wheel directly behind the front wheel, a steering-post provided with a fork in which the front wheel is mounted, a lower frame having the rear wheel journaled thereon, an upper frame, journals on the front ends of the frames, in which the steering-post is journaled, means for spacing the rear ends of the frames and securing them rigidly together, an operating shaft journaled on the lower frame, means connected to the said shaft for driving the rear wheel, a motor supported on one of the frames for driving the said shaft, and means for controlling the steering-post.

In testimony whereof I affix my signature in the presence of two witnesses.

EUGENE ADLER.

Witnesses:
MAX H. SROLOVITZ,
MARIE H. ZBIERA.

Copies of this patent may be obtained for five cents each, by addressing the "Commissioner of Patents, Washington, D. C."